United States Patent [19]

Roth et al.

[11] 4,240,660
[45] Dec. 23, 1980

[54] APPARATUS FOR TRANSPORTING SHEETS OF GLASS IN A VERTICAL POSITION

[75] Inventors: Mario Roth, Aachen; Werner Pagel, Herzogenrath; Günther Schmidt, Aachen-Richterich; Laurenz Hausmann, Gangelt, all of Fed. Rep. of Germany

[73] Assignee: Saint-Gobain Industries, Neuilly-sur-Seine, France

[21] Appl. No.: 65,734

[22] Filed: Aug. 10, 1979

[30] Foreign Application Priority Data

Aug. 11, 1978 [FR] France ................ 78 23709

[51] Int. Cl.³ .................................... B66C 1/48
[52] U.S. Cl. .................... 294/81 R; 248/323; 294/86 R; 294/118
[58] Field of Search ............ 294/67 AA, 78 A, 81 R, 294/86 R, 118; 65/106, 114, 118; 177/172, 251, 261; 248/323, 477, 496; 269/63, 74

[56] References Cited

U.S. PATENT DOCUMENTS

| | | | |
|---|---|---|---|
| 2,115,106 | 4/1938 | Hinsey | 294/118 |
| 2,252,703 | 8/1941 | De Tailly | 294/81 R X |
| 3,010,753 | 11/1961 | Russ et al. | 294/118 |
| 3,092,413 | 6/1963 | Davidson | 294/86 R |
| 3,410,597 | 11/1968 | Skelding | 294/118 |
| 3,454,298 | 7/1969 | Bognar | 294/118 |

Primary Examiner—Johnny D. Cherry
Attorney, Agent, or Firm—Pennie & Edmonds

[57] ABSTRACT

Apparatus for transporting a sheet of glass in a vertical position where the apparatus has self-tightening tongs adapted to clasp an upper portion of the sheet. The tongs are operatively connected to a strap having a toothed support face. A beam supported by a trolley has a toothed support face thereon where the spaces between the teeth differ from the teeth of the strap. A differential block having a plurality of teeth on its upper side corresponding in shape and pitch to the teeth of the strap and having a plurality of teeth on its lower side corresponding in shape and pitch to the teeth of the beam is inserted between the support face of the beam and the strap to provide an adjustable connection between the beam and strap.

5 Claims, 6 Drawing Figures

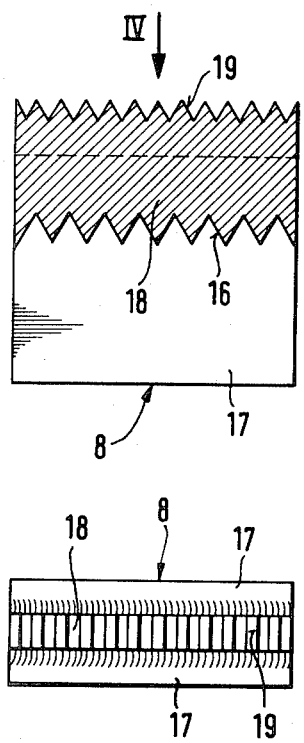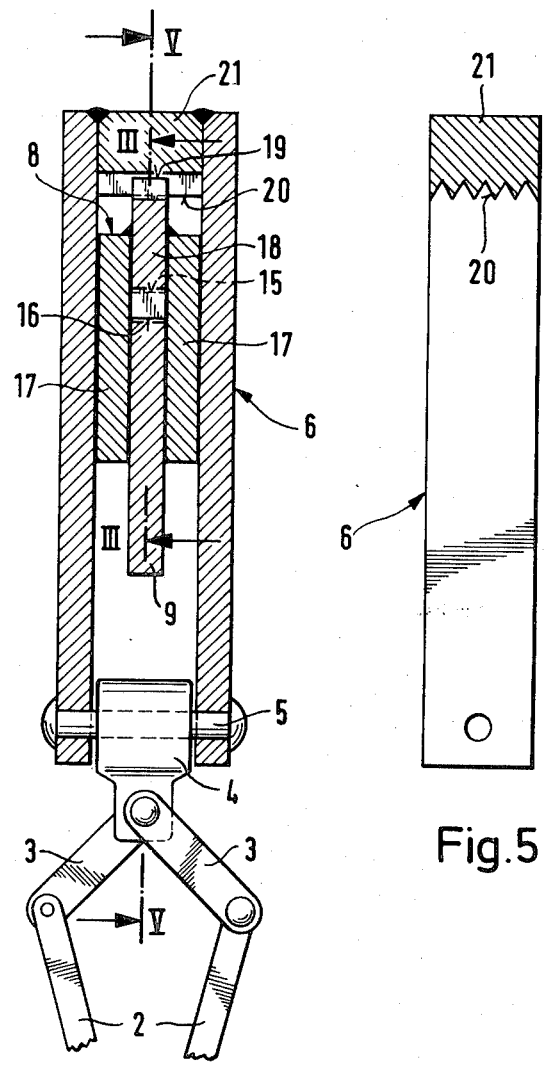

4,240,660

APPARATUS FOR TRANSPORTING SHEETS OF GLASS IN A VERTICAL POSITION

FIELD OF THE INVENTION

The invention relates to an apparatus by which a sheet of glass may be suspended vertically by self-tightening tongs and moved through different processing stations. The tongs are suspended from a strap which in turn is adjustably carried by a beam mounted to a trolley whereby the horizontal position of the tongs with respect to the sheet of glass or to glass working tools may be accurately determined.

BACKGROUND OF THE INVENTION

Tongs are presently used to engage vertically suspended sheets of glass which are moved through various treatment stations. The tongs are closed automatically by the weight of the sheet so as to firmly clasp the sheet along its upper edge. In one form of prior art device the tongs are connected to a yoke which is adjustably positioned on a carrying beam mounted to a handling trolley. An example of such a device is disclosed in U.S. Pat. No. 3,010,753. In order that the horizontal position of the yoke which supports the tongs may be varied, the support face of the carrying beam has a plurality of hollow recesses into which a bolt connected to the yoke may be screwed. The accuracy of the positioning of the tongs along the sheet of glass is determined by the distance between the various recesses into which the holding bolt is screwed.

In a further form of a handling device used to date, a supporting beam which forms a part of a transport trolley carries a toothed rack where a ring to which tongs are connected is placed in a desired position in a space between adjacent teeth of the toothed rack. Accuracy of positioning in such a device is determined by the spacing between the teeth of the rack. Such a device is disclosed in German Pat. No. 1,596,394.

It is desirable that tongs which support a sheet of glass be positioned in precise positions along the sheet and particularly when the sheet passes through a pressing station to undergo bending into a convex shape involving small radii of curvature. If the sheet to be bent is not precisely positioned in the pressing station, tolerances pertaining to a particular shape may not be obtained such that glass sheets will be rejected as not meeting quality control standards.

Further it is important that the tongs gripping a sheet of glass be precisely positioned in relation to the tools for bending the glass with the caveat that the more sharply the sheets are to be bent, the more important it is that the tongs be accurately placed. Even after pressing and bending of the sheet has taken place, that is when the molds are removed, the tongs must not exert a great amount of force on the sheet as the sheet could be bent out of shape. When multiple tongs are used to obtain a multiple suspension of a sheet, it is the usual procedure to suspend the tongs from a beam mounted to a trolley at particular points on the beam which lie directly above the center of gravity of the bent portions of the sheet. This demands extreme precision in placement of the tongs. Multiple engagement of tongs using this procedure is disclosed in German Patent Application Publication No. 1,596,394.

Structure used to date for positioning tongs onto beams or of attaching beams onto handling trolleys are of relatively rough construction. This is because the structures, the beams and the tongs are all subjected to large temperature fluctuations passing from an ambient temperature to temperatures in excess of 650° C. Under such conditions, rugged heavy parts are required to withstand the temperature changes.

In apparatus used to date, it is difficult, if not impossible, to provide for easy, convenient and precise adjustment of the suspension tongs with respect to the handling trolley.

It is therefore an object of the invention to provide for an apparatus which will allow easy, convenient and precise positioning of suspension tongs with respect to a suspension beam and with respect to a handling trolley and where the structure of the apparatus is simple, rugged and sufficient to withstand extreme changes of temperature.

DISCLOSURE OF INVENTION

Broadly our invention comprises an apparatus having suspension tongs, a carrying strap from which the tongs are suspended and a supporting beam mounted to a trolley. The strap and beam each have a supporting face including a plurality of teeth where the pitch of the teeth associated with the beam differs from that of the pitch of the teeth associated with the strap. A differential block having a plurality of teeth on an upper surface corresponding in shape and pitch to the teeth of the strap and a plurality of teeth on a lower surface corresponding in pitch and shape to the teeth of the beam is positioned between the beam and strap. Movement of the block relative to the beam and strap provides vernier type of adjustment to provide precise positioning of the strap and consequently of the tongs with respect to the beam.

In a further form of the invention a supplemental or second beam, blocks and straps may be included between the carrying strap and the tongs to provide a still further degree of precision adjustment of the tongs with respect to the beam mounted to the trolley. Further the supplemental beam and straps may be made rotatable with respect to the main strap by providing a rotatable yoke connection between the supplemental beam and main strap to assist in movement of sheets having complex shapes.

BRIEF DESCRIPTION OF DRAWINGS

FIG. 2 is an enlarged section of a portion of FIG. 1 taken along lines II—II;

FIG. 3 is a cross-sectional view of FIG. 2 taken along lines III—III;

FIG. 4 is a plan view of FIG. 3 taken in the direction of line IV;

FIG. 5 is a side sectional view of a strap taken along lines V—V of FIG. 2; and

BEST MODES FOR CARRYING OUT THE INVENTION

Figure 1:
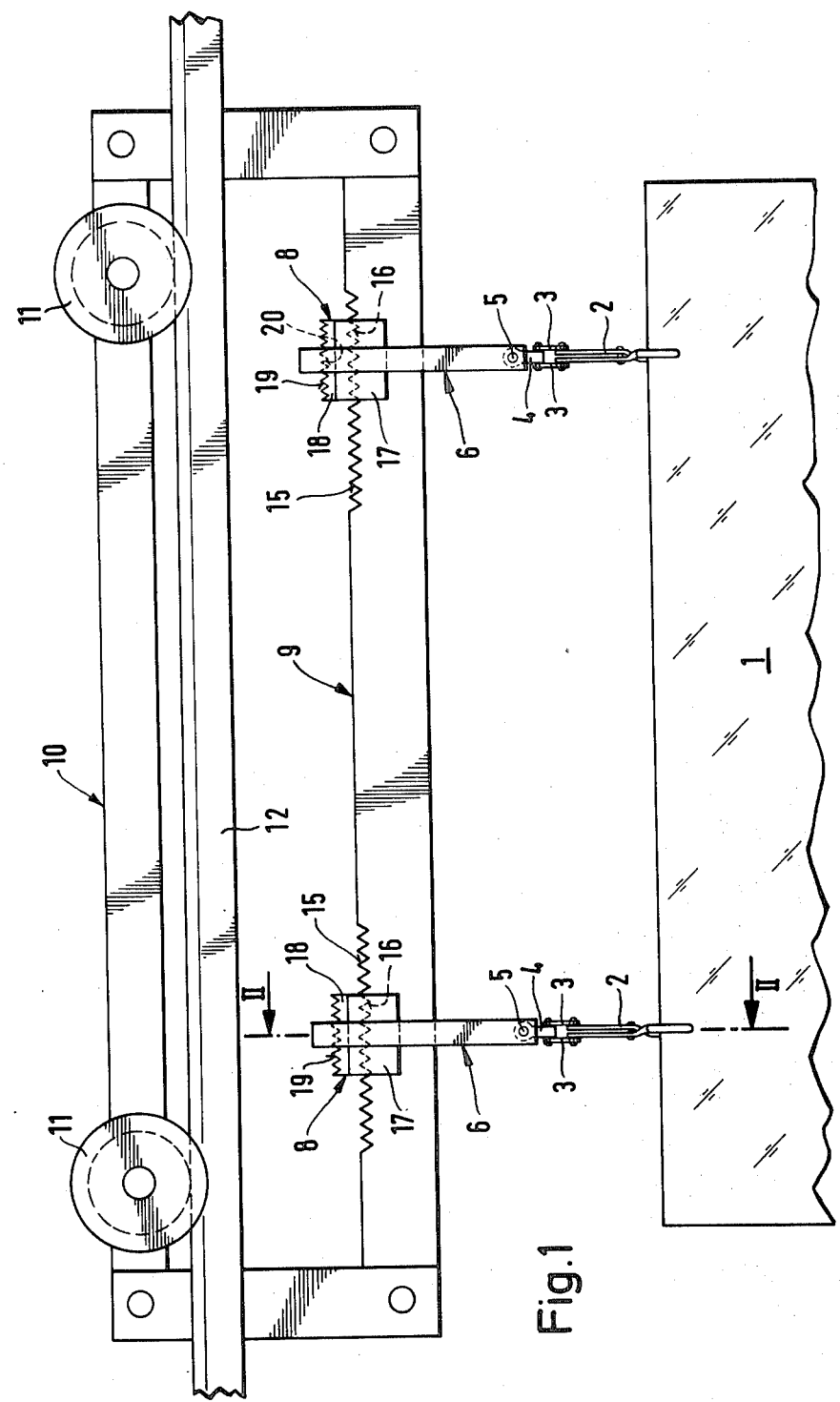
FIG. 1 is a side view of an apparatus for transporting a sheet of glass in a vertical position constructed according to the invention.

Referring to FIGS. 1-5 there is illustrated an apparatus for vertically suspending a sheet of glass 1 by means of self-tightening tongs 2 in order that the sheet may be moved through different production stations. The tongs 2 are connected by means of levers 3 to a bearing 4 which is rotatable about a pin 5 mounted on a first or main carrying strap 6. The strap 6 rests on a first or main differential block 8 in turn supported by a first or main beam 9 mounted to a trolley 10. Trolley 10 is carried by rollers 11 which run upon a rail 12.

The block 8 is in the form of a rider and has two side plates 17 which extend down over the sides of the beam 9 and which are connected by a toothed rack 18 having teeth 19 on its upper surface and teeth 16 on its lower surface. The beam 9 has a support face including a plurality of teeth 15 which engage with the teeth 16 of the block where the teeth 15 and 16 are of the same size and pitch. The strap 6 is U-shaped in form where the legs of the U-shape are joined by a connecting piece 21 which has a support face including a plurality of teeth 20. Teeth 20 engage with the teeth 19 of the block where the teeth 19 and 20 are of the same size and pitch.

The teeth 15 and 16 have a pitch of 6 mm while the teeth 19 and 20 have a pitch of 4 mm. By this arrangement an adjustment of 2 mm may be made in the positioning of the strap and consequently the tongs 2, by moving the block in one direction one tooth width and the strap in the opposite direction one tooth width. Thus a small degree of variance on the order of 2 mm may be achieved even though the pitch of the two sets of teeth is larger and more rugged. By selecting a different ratio of pitch for the two sets of teeth, for example 6 mm and 5 mm, the degree of adjustment may be reduced to 1 mm.

Figure 6:
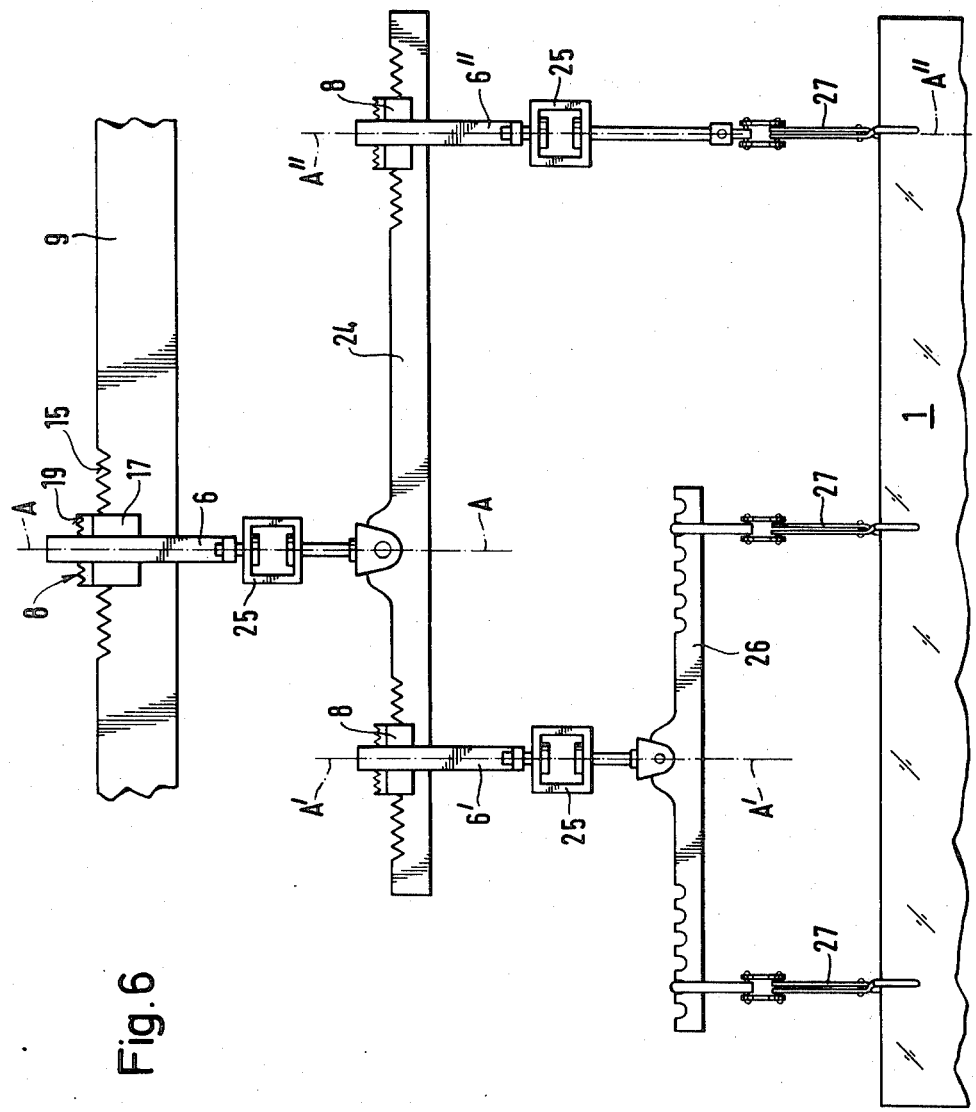
FIG. 6 is a side view of a further embodiment of the invention.

Referring to FIG. 6, a further form of the invention is shown where the apparatus provides a multiple suspension of a sheet of glass. The apparatus includes a second or secondary beam 24 which is connected to the main or first strap 6 by way of a yoke 25 which is rotatable about the vertical axis A—A. A second or secondary strap 6' is supported by a second block 8 in turn carried by one arm of the beam 24 by which a further second strap 6" is supported by a further block 8 carried on the opposite arm of the beam 24. A further beam 26 is suspended from strap 6' by way of a rotatable yoke 25 such that beam 26 and the tongs connected to it are rotatable about the vertical axis A'—A'. Tongs 27 suspended from strap 6" through the yoke 25 are free to rotate about vertical axes A"—A".

Horizontal adjustment of the vertical axis A—A, A'—A' and A"—A" is made in the same manner as with the apparatus of FIG. 1, namely by moving the blocks 8 relative to the straps and beam. By this construction, precise and accurate positioning of the tongs may be achieved when a sheet is suspended by multiple suspension fastenings.

We claim:

1. Apparatus for transporting sheets of glass in a vertical position having tongs adapted to engage a sheet of glass, a first strap having a support face operatively connected to said tongs and a trolley supported first beam having a support face from which said first strap is suspended, the improvement comprising in that the support face of said first strap and the support face of said first beam are each provided with a plurality of teeth wherein the pitch of the teeth associated with the first beam differs from the pitch of the teeth associated with the first strap, and a first differential block having a plurality of upper teeth corresponding in shape and pitch to the teeth associated with said first strap and a plurality of lower teeth corresponding in shape and pitch to the teeth associated with the first beam whereby when said first differential block is inserted between the support faces of the first beam and the first strap, the first strap will be adjustably suspended from the first beam.

2. Apparatus according to claim 1 wherein the difference in pitch between the teeth associated with the first beam and the teeth associated with the first strap is on the order of 1–2 mm.

3. Apparatus according to claim 1 wherein the pitch of the teeth associated with the first beam and the lower teeth of the first differential block is on the order of 6 mm and the pitch of the teeth associated with the first strap and the upper teeth of the first differential block is on the order of 4 mm.

4. Apparatus according to claim 1 having in addition a second beam, a second strap connected to said tongs, and a second differential block all interposed between said first strap and said tongs where said second strap has a support face with teeth similar in shape and pitch to the teeth of the first strap, where said second beam has a support face with teeth similar in shape and pitch to the teeth of the first beam, and wherein said second differential block has teeth similar in shape and pitch to the teeth of said first differential block whereby when said second differential block is inserted between said second strap and said second beam, said second strap will be adjustably suspended from the second beam.

5. Apparatus according to claim 4 wherein said second beam is suspended from said first strap by a rotatable yoke whereby said second beam may rotate about a vertical axis with respect to said first beam.

* * * * *